United States Patent [19]

Legille

[11] 4,253,485
[45] Mar. 3, 1981

[54] VALVE FOR OPENING AND CLOSING A FLUID CONDUIT

[75] Inventor: Edouard Legille, Luxembourg, Luxembourg

[73] Assignee: Paul Wurth, S.A., Luxembourg

[21] Appl. No.: 909,934

[22] Filed: May 26, 1978

[30] Foreign Application Priority Data

Jun. 6, 1977 [LU] Luxembourg .................... 77487

[51] Int. Cl.³ .................. F16K 43/00; F16K 31/122
[52] U.S. Cl. .................. 137/315; 251/174; 251/177; 251/298; 251/58
[58] Field of Search ................. 251/58, 159, 174, 177, 251/298, 315, 62; 137/315

[56] References Cited

U.S. PATENT DOCUMENTS

| | | |
|---|---|---|
| 3,266,525 | 8/1966 | Wolter .................. 251/159 |
| 3,410,422 | 11/1968 | Carpentier .................. 251/62 |
| 3,474,818 | 10/1969 | Hartman .................. 137/315 |
| 3,485,475 | 12/1969 | Moore et al. .................. 251/159 |
| 3,580,539 | 5/1971 | Van Scoy .................. 251/159 |
| 3,724,809 | 4/1973 | Reale .................. 251/58 |
| 3,727,880 | 4/1973 | Stock .................. 251/58 |
| 3,799,188 | 3/1974 | Chronister .................. 137/315 |
| 3,916,949 | 11/1975 | Armstrong .................. 251/298 |
| 3,995,827 | 12/1976 | Piguet .................. 251/58 |
| 4,130,268 | 12/1978 | Kojima .................. 251/298 |
| 4,144,902 | 3/1979 | Mahr .................. 251/58 |
| 4,150,811 | 4/1979 | Condit .................. 251/315 |

FOREIGN PATENT DOCUMENTS

| | | |
|---|---|---|
| 2136216 | 6/1974 | Fed. Rep. of Germany . |
| 619235 | 3/1961 | Italy .................. 251/315 |
| 128274 | 11/1928 | Sweden .................. 251/315 |
| 674771 | 7/1952 | United Kingdom .................. 251/159 |
| 782851 | 9/1957 | United Kingdom .................. 251/159 |

Primary Examiner—Martin P. Schwadron
Assistant Examiner—G. L. Walton

[57] ABSTRACT

A valve for opening and closing a fluid conduit of the type having a generally wide cross section, the conduit having a transverse slit therein to allow for movement of a shut-off plate therethrough. The shut-off plate has a spherical shape and defines a center about which the shut-off plate may be arcuately displaced to close the conduit when the plate is positioned within the conduit and to open the conduit when the plate is positioned external to the conduit.

12 Claims, 9 Drawing Figures

VALVE FOR OPENING AND CLOSING A FLUID CONDUIT

BACKGROUND OF THE INVENTION

(1) Field of the Invention

The present invention relates to a valve for opening and closing a fluid conduit. More specifically, the present invention relates to an apparatus for opening and closing a gas pipe having a generally wide cross section. Although not limited thereto, the invention has utility in a pipe for conducting crude blast furnace gases from a blast furnace used in the manufacture of steel.

(2) Description of the Prior Art

In the manufacture of steel, crude gas at the top of the blast furnace is directed vertically through a collector pipe. The collector pipe directs the gas to a purifying installation such as a dust removal means wherein particulate matter is separated from gases. The crude gas from a blast furnace comprises a mixture of combustion gases, steam and particles of dust having varying sizes. The crude gas is released from the blast furnace at high temperatures and high pressures. Because the gas is under high pressure and temperature and contains particulate matter, the mechanical elements which contact the crude gas such as sealing surfaces and the like are vulnerable to considerable wear and strain.

In a collector pipe, it is particularly important to provide a valve for opening and closing the pipe in order to isolate the source of the crude gas, that is, the blast furnace and other mechanical devices situated downstream of the source of the crude gas. It is desirable that the mechanical means of opening and closing the collector pipe be capable of being rapidly actuated and have a relatively simple structure. Conventional collector pipes are equipped with an apparatus for stopping up the pipes in order to allow isolation of the blast furnace. A conventional collector pipe has a generally cylindrical shape and includes a slit transverse to the axis of the pipe. The slit defines a plane through which a variety of planar plates are moved in and out of the slit to open and close the collector pipe. A valve of this type is described in German Pat. No. 2,136,216. The most common valves comprise a planar disc or cover which is slid perpendicular to the axis of the pipe into the pipe. Another type of valve is a "goggle valve" which comprises a plate having a circular opening at one end and being solid at the other end. With this type of plate, when the opening is aligned with the collector pipe, the collector pipe is in open condition. When the solid part of the plate is aligned in the collector pipe, the collector pipe is in the closed position.

The valves for opening and closing the collector pipe must satisfy accident prevention standards which require that no person may work downstream of the blast furnace except behind a fully closed collector pipe. That is, the pipe must be completely closed in the direction transverse to the axis of the pipe so that the risk of crude gas being allowed to pass downstream of the valve is practically nil. In the case of collector pipes under high temperatures and pressures, the conventional valves fail to provide sufficient hermetic sealing from the inside of the collector pipe to the outside of the collector pipe. Also, during opening and closing of the valve, there is considerable leakage of the crude gas to areas external to the pipe. To prevent leakage of crude gases, the valve is provided with a tight armoring that completely surrounds the valve and the mechanism which moves the valve in order to insure hermetic sealing. Because the plate of the valve is moved inwardly and outwardly of the collector pipe in a plane transverse to the axis of the pipe, the armoring of the valve must extend a generally large distance away from the outer wall of the collector pipe. An armoring which is capable of withstanding the large pressures and temperatures associated with crude gas from a modern blast furnace must have increased weight in order to provide sufficient sealing. Moreover, in order to allow access to the valve for repair or replacement, an expensive and cumbersome superstructure for supporting the valve and the armoring must be provided. In modern blast furnaces, the tendency to operate at increasingly high pressures aggravates the foregoing problems.

Because of the very nature of crude gas from a blast furnace, particularly its high humidity and particulate content, the sealing surfaces of the valve and the control elements for operating the valve are subject to wear and, thus, the valve parts must be repaired or replaced periodically. Moreover, the particulate matter from the crude gas deposits on the plate of the valve when the plate is introduced into the pipe. Since the plate is planar and is displaceable transversely with respect to the axis of the pipe, a comparatively large planar surface is exposed. The removal of deposits from this surface is difficult.

The purpose of the present invention is to provide a valve for opening and closing a conduit having a wide cross section. One object of the present invention is to provide improved hermetic sealing of the valve with respect to the environment external to the conduit.

Another object of the present invention is to reduce the weight of the equipment required to support the valve and its armoring. It is another object of the invention to reduce the weight of the superstructure required to support the valve and its armoring. It is still a further object of the present invention to provide a valve and armoring which may be fitted into a smaller space.

It is still a further object of the present invention to provide a valve and armoring which facilitates maintenance and cleaning of the valve.

SUMMARY OF THE INVENTION

The present invention provides a valve which allows for reduced weight of the armorment surrounding the valve and which also provides for reduced consumption of space. Moreover, the present invention provides a valve which may be actuated by a simplified mechanical means. Furthermore, the valve of the present invention facilitates maintenance and cleaning of the valve.

The present invention provides a valve for opening and closing a fluid conduit having a generally wide cross section. Although the present invention is particularly useful in blast furnace installations, it should be understood that the present invention is useful to open and close any conduit through which fluid passes. The fluid conduit, such as a collector pipe having a wide cross section, includes a transverse slit therein to allow for shutter type movement of a valve plate. The valve includes a shut-off plate having a generally spherical shape which defines a center about which the shut-off plate may be displaced. The plate is arcuately displaced about its center to close the fluid conduit when the plate is positioned within the conduit. The conduit is opened when the plate is moved to a position external to the conduit. According to a first embodiment of the invention, the shut-off element consists of a shut-off plate having a spherical shape and including a peripheral circular sealing surface. In a second embodiment of the invention, the shut-off plate consists of a spherically shaped full section which provides for closure of the conduit and an open section which allows for opening of the conduit.

Because the shut-off plates of the present invention have a spherical shape, and the actuation of the plates causes them to move along an arcuate path, when the valves are in the open position the valve plates are located adjacent the outside of the pipe. This is contrasted with the prior art valve wherein the plates move away from the pipe in a direction transverse to the axis of the pipe.

The above-described movement of the shut-off plate enables the size and weight of the armoring to be considerably reduced. Because this armoring can be made in an arcuate shape such as spherical or cylindrical, the armoring will withstand increased pressure because arcuate shapes, in general, have an increased resistance to pressures. Since the strength of the armoring is increased by its arcuate shape, the armoring may be constructed of a far lighter weight than heretofore known in the art. This type of armoring not only provides an appreciable saving of space and an enormous saving of weight, but also provides a simplified mechanical means of moving the shut-off plate. In one embodiment of the invention, the shut-off plate is supported by two shafts, each shaft having one end thereof affixed to the shut-off plate and the other end thereof rotatably mounted on the fluid conduit, preferably in a plane passing through the axis of the conduit. The shafts pivot through an angle of about 90° in order to position the shut-off plate either within the conduit to close the conduit or external to the conduit to allow passage of fluid therethrough. The shafts are rotatably positioned at the center of curvature of the spherically shaped shut-off plate.

Further advantages and features of the present invention will be apparent from the following detailed description of specific embodiments of the present invention, by way of reference to the drawings.

DETAILED DESCRIPTION OF THE INVENTION

Figure 1:
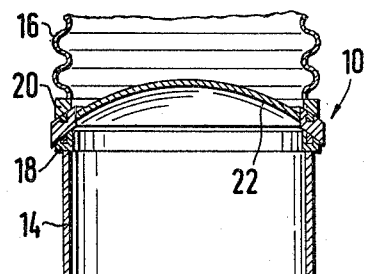
FIGS. 1-3 are schematic diagrams of a first embodiment of the valve wherein the shut-off plate has a circular periphery.
Figure 2:
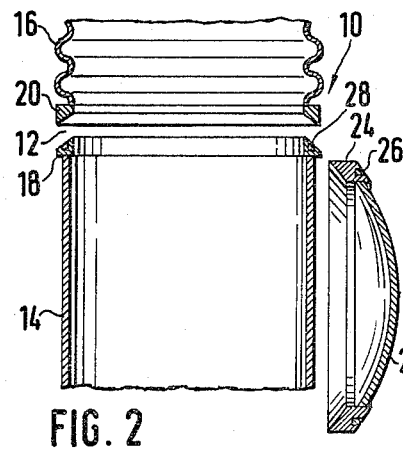
Figure 3:
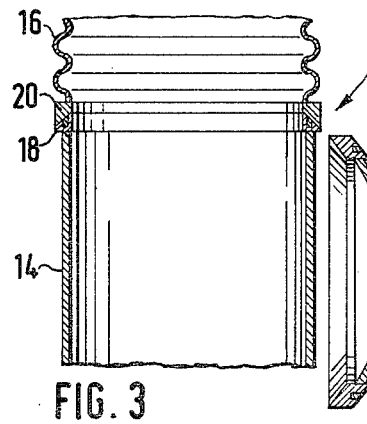

Referring to FIGS. 1, 2 and 3, a collection pipe 10 is situated intermediate a dust removal device (not shown) and a source of crude gas which is fed through pipe 10. A peripheral slit 12 separates lower part 14 of pipe 10 from the upper part which includes a compensator 16. Compensator 16 enables slit 12 to be opened or closed by axial displacement of the peripheral flange 20 which is fitted to compensator 16. The lower part of pipe 10 is fitted with a peripheral flange 18, flange 18 being capable of alignment with flange 20 to hermetically seal the pipe 10 when the pipe 10 is in the open condition.

The shut-off plate 22 comprises a spherical cap, the radius of curvature of the cap being greater than the radius of the pipe 10. The shut-off plate 10 is movable by a mechanism which will be described hereinafter between a closed position shown in FIG. 1 and an open position shown in FIG. 3. The shut-off plate 22 includes a reinforced cylindrical peripheral edge designed to interact in the closed position with flanges 18 and 20 in order to provide hermetic sealing. The sealing surfaces of flanges 18 and 20 are shaped so as to accurately fit edge 24 of the shut-off plate 22. In order to improve the hermetic sealing between edge 24 and flange 20, the edge 24 may include an annular ring 26 which is made of a soft resilient material. Similarly, flange 18 may be fitted with a resilient annular sealing ring insert 28 which also provides for improved hermetic sealing.

Referring to FIG. 1, which shows the pipe 10 in the closed position, before the pipe 10 can be opened, the flange 20 is raised by means of contraction of compensator 16 so that edge 24 of the shut-off plate 22 can be separated from flange 20. The raising of flange 20 is accomplished by conventional mechanical means. The flanges 18 and 20 are opened a predetermined distance to allow movement of shut-off plate 22 to a position external to the pipe as shown in FIG. 2. It should be understood that it is during the removal of plate 22 from the interior of the pipe that it is desirable to provide an armor or external valve housing to contain fluids flowing through gap 12. When the plate 22 is completely removed from the pipe 10 as shown in FIG. 2, the compensator is released and flanges 18 and 20 engage one another to hermetically close slit 12. As can be appreciated from FIGS. 1, 2 and 3, when the pipe 10 is in the open position as shown in FIG. 3, the cover is located closely adjacent to the exterior of pipe 10.

Figure 4:
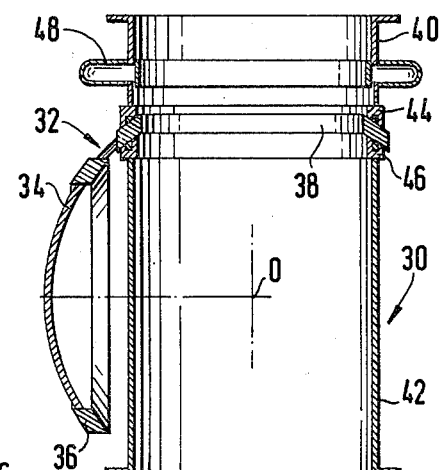
FIGS. 4 and 5 are schematic diagrams of a second embodiment of the invention in which the shut-off plate comprises a spherically shaped plate including an opening in one end thereof.
Figure 5:
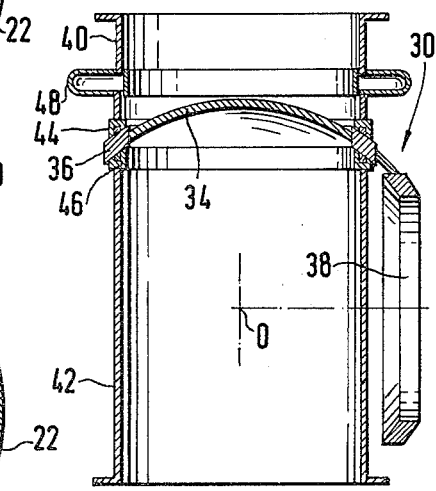

FIGS. 4 and 5 show a second embodiment of a valve for opening and closing of a fluid conduit. FIG. 4 shows pipe 30 in the open position and FIG. 5 shows pipe 30 in the closed position. The valve 32 corresponds to conventional plates which are referred to in the art as "spectacle-blinds" wherein one portion of the plate includes an opening and the other portion includes a solid surface which acts as the surface which prevents flow of fluid. However, valve 32 differs from prior art devices in that it has a spherical shape which defines a center, marked O on the drawings. Valve 32 is formed by a ring 36 surrounding a shut-off plate 34 having the shape of a spherical cap and a ring 38 which includes an opening. The upper part 40 and lower part 42 of pipe 30 are separated by valve 32 and are provided at their adjacent ends with flanges 44 and 46. The sealing surfaces of flanges 44 and 46 may be fitted with resilient sealing ring inserts in order to improve hermetic sealing.

As distinguished from the first embodiment of the invention described in FIGS. 1, 2 and 3, the valve 32 in FIGS. 4 and 5 is never completely released from pipe 30. In the open position shown in FIG. 4, ring 38 is situated between flanges 44 and 46 whereas in the closed position as shown in FIG. 5 the plate 34 and its ring 36 are situated between flanges 44 and 46. The axial displacement of the movable flange 44 is smaller than the displacement of flange 20 shown in FIGS. 1, 2 and 3, since all that is required is to release one of the rings 36 or 38 in order to enable movement of valve 32. It is nonetheless desirable to provide a compensator 48. Compensator 48 may be smaller and can be provided with, for example, a single corrugation. In both the embodiments shown in FIGS. 1, 2 and 3 and that shown in FIGS. 4 and 5 the interior lower flanges 28 and 46, respectively, and/or the respective upper flanges 20 and 44 may contain a conduit for the circulation of the cooling agent such as water or inert gas in order to decrease wear of these elements and improve the hermetic seal.

Figure 6:
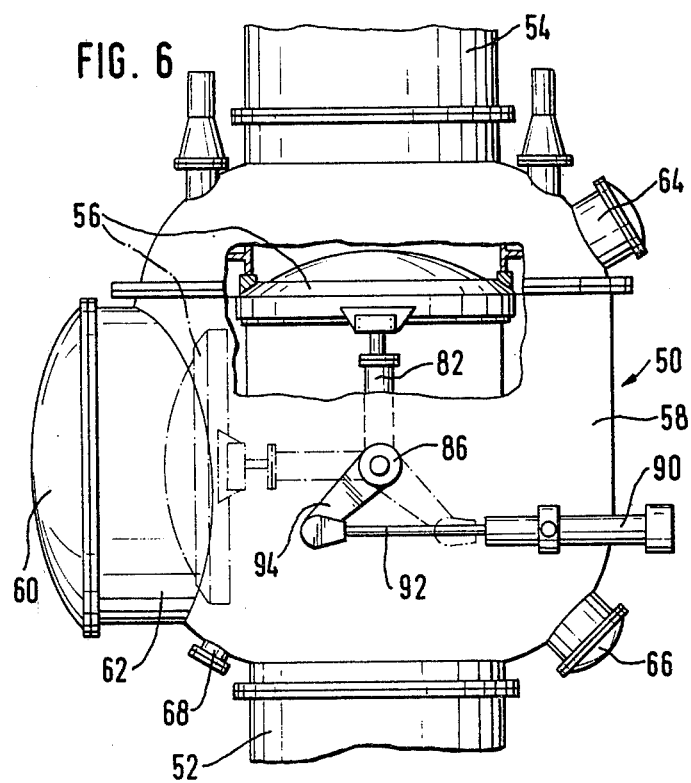
FIG. 6 is a schematic diagram of an apparatus for moving the shut-off plate of the type shown in FIGS. 1, 2 and 3.
Figure 8:
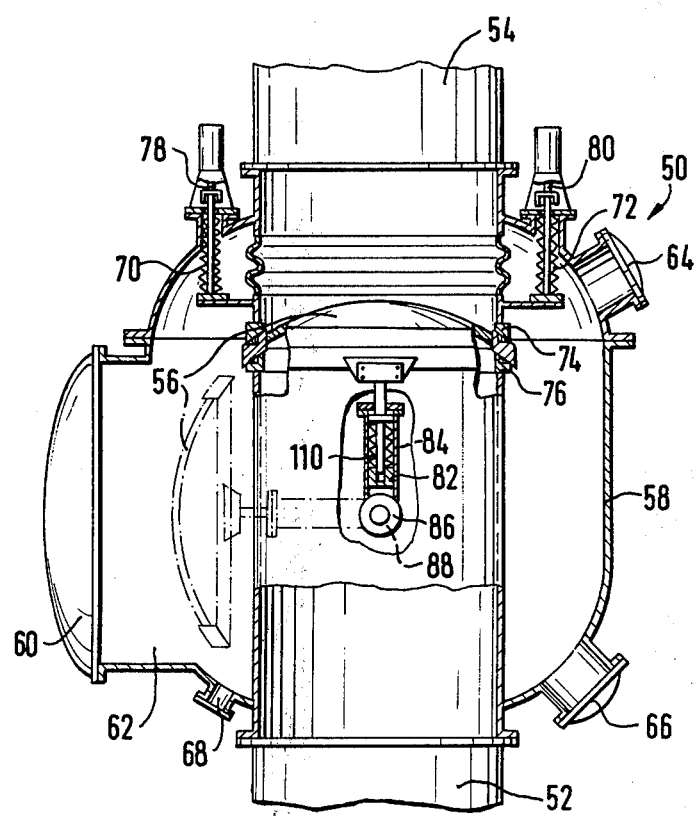
FIG. 8 is a longitudinal sectional view of FIG. 6.

Referring simultaneously to FIGS. 6 and 8, a valve indicated generally at 50 with a pressure casement or armorment is shown. Valve 50 is positioned between lower pipe 52 and upper pipe 54. The shut-off plate comprises a cover type plate such as that shown in FIGS. 1, 2 and 3. However, it should be understood that a spectacle blind type shut-off plate as shown in FIGS. 4 and 5 could be used without any major modification of the structure of the valve. The valve includes an outer armoring 58 which hermetically seals the valve with respect to the external atomsphere. As stated earlier, during operation of the shut-off plate 56, leakages of gas through the slit in the pipe occur. The higher the pressure, the more serious these gas leakages will be. The armoring 58 seals off the valve from the external environment whether plate 56 is in the opened or closed position.

As distinguished from the conventional armoring which is used with the prior art horizontally actuated planar plate type valves, armoring 58 may be constructed on very compact arcuate lines such as spherical or cylindrical lines because relatively little space is required for movement of shut-off plate 56. Because of its arcuate shape, the size and weight of armoring 58 may be reduced and still resist relatively high gas pressures.

Armoring 58 includes an access aperture 62 covered by a cap 60. The aperture 62 is situated adjacent the position the shut-off plate 56 will assume when in the open position, so that plate 56 can be removed through the aperture 62.

A pair of additional 64 and 66 enable the armoring 58 to be ventilated and the space between the wall of the armoring 58 and the gas pipe to be drained. Apertures of this type enable maintenance operations to be carried out inside armoring 58 without any risk to the maintenance personnel. Aperture 64 may be controlled to allow gas to escape therethrough so that maintenance can be undertaken downstream of pipe 52 when shut-off plate 56 is in the closed position. Thus, gas which tends to leak around shut-off plate 56 passes through aperture 64 rather than continuing downstream through pipe 54. When the blast furnace has been shut off, apertures 64 and 66 allow maintenance operations to be carried out upstream of the valve, the maintenance personnel being protected from leaks emanating from downstream installations. Ventilation apertures 64 and 66 can be fitted with a small auxiliary valve (not shown), the control of which can be a function of the action of the shut-off plate 56 so that these valves would automatically be open when the cover is closed.

A cleaning aperture 68 enables any dirt deposited on the internal base of the armoring 58 to be removed. Because the shut-off plate 56 is convexly shaped, deposits formed thereon tend to slide over its periphery and form on the base of armoring 58. Access to shut-off plate 56 through aperture 62 enables the surface of the plate 56 to be cleaned by, for example, means of a jet of water. It is even possible to provide near the zone of the aperture 62, a set of nozzles which are directed onto the convex surface of the shut-off plate 56 and which can be operated as desired.

In order to insure hermetic sealing between the two flanges 74 and 76, respectively on the downstream conduit 54 and the upstream or supply conduit 52, or between these two flanges and the ring of shut-off plate 56 in the closed position, the movable flange is subjected to the action of a plurality of springs 70 and 72. These springs 70 and 72, preferably of the "belleville" type, urge flange 74 toward shut-off plate 56 or toward lower flange 76. The compression of the springs 70 and 72 is effected by means of hydraulic jacks 78 and 80 preferably mounted on the outside of armoring 58. Jacks 78 and 80 are actuated whenever upper flange 74 has to be raised in order to enable the shut-off plate 56 to be moved, either for the closing or opening of the fluid conduit.

The mechanism for moving shut-off plate 56 is as follows. Shut-off plate 56 is supported by two arms 82 and 84 situated opposite each other on two sides of the fluid conduit and between the fluid conduit and the armoring. Arms 82 and 84 are pivotable about shafts 86 and 88 which are preferably located in diametrically opposite positions in housings in the wall of armoring 58. The axis of shafts 86 and 88 preferably passes through the axis of the fluid conduit. To move the shut-off plate 56, arms 82 and 84 are pivoted about shafts 86 and 88 by any mechanical means through an angle of about 90°. This movement can be brought about by two hydraulic jacks such as the jack 90 shown in FIG. 6. Jack 90 is supported in a suitable manner outside the armoring. Piston rod 92 actuates a connecting rod 94 which in turn acts upon shaft 86. The open position of the valve is shown in dot and dash lines and the closed position of the valve is shown in solid lines. Because shut-off plate 56 has a convex shape and is relatively lightweight, a single jack acting on one of the two shafts 86 and 88 is, in general, sufficient to actuate the shut-off plate 56. However, it is desirable to provide symmetrical forces and thus it is preferable to provide two small jacks, one on either side of the armoring 58 to act upon shafts 86 and 88.

Figure 7:
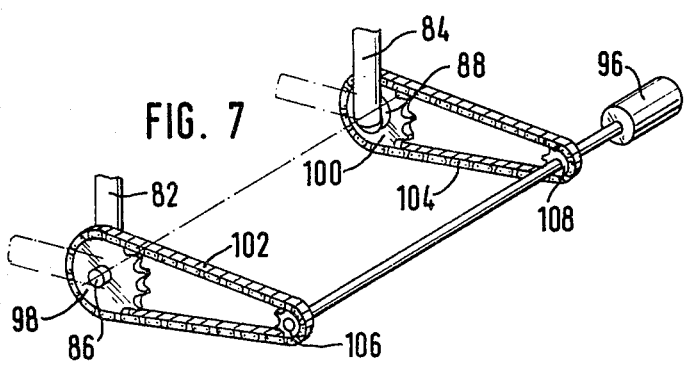
FIG. 7 is a schematic diagram of an alternative embodiment of an apparatus for moving the shut-off plate of the type shown in FIGS. 1, 2 and 3.

FIG. 7 shows an alternative embodiment in which the movement of shut-off plate 56 is brought about by a single mechanical drive 96 such as a hydraulic or electric motor. This schematic diagram shows only the elements required to enable transmission of the movements to be understood. A shaft driven by motor 96 includes two sprocket wheels 106 and 108 while shafts 86 and 88 include sprocket wheels 98 and 100. These chain wheels 98 and 100 are connected to sprockets 106 and 108 via roller chains 102 and 104. Rotation of sprocket wheels 106 and 108 causes movement of chains 102 and 104 which, in turn, causes rotation of sprocket wheels 98 and 100.

Referring to FIG. 8, in one embodiment of the invention, the two arms 82 and 84 supporting shut-off plate 56 are of the telescopic type. Each of these arms 82 and 84 includes a compression spring 110 such as a stack of "belleville" washers, the compression springs being sufficiently strong to urge the shut-off plate 56 upwardly against flange 74. Springs 110 are weaker than springs 70 and 72 in order to prevent counteraction of springs 70 and 72 and, thus, insure a tight hermetic seal.

The purpose of springs 110 is to raise the shut-off plate 56 a short distance away from the lower seating when springs 70 and 72 are compressed by hydraulic jacks 78 and 80 to prevent the shut-off plate 56 from rubbing against sealing surface of lower flange 76 when the valve is being opened or closed. When the valve is in the closed position, shut-off plate 56 is held between sealing surfaces 74 and 76 by the action of springs 70 and 72 in opposition to springs 110.

Figure 9:
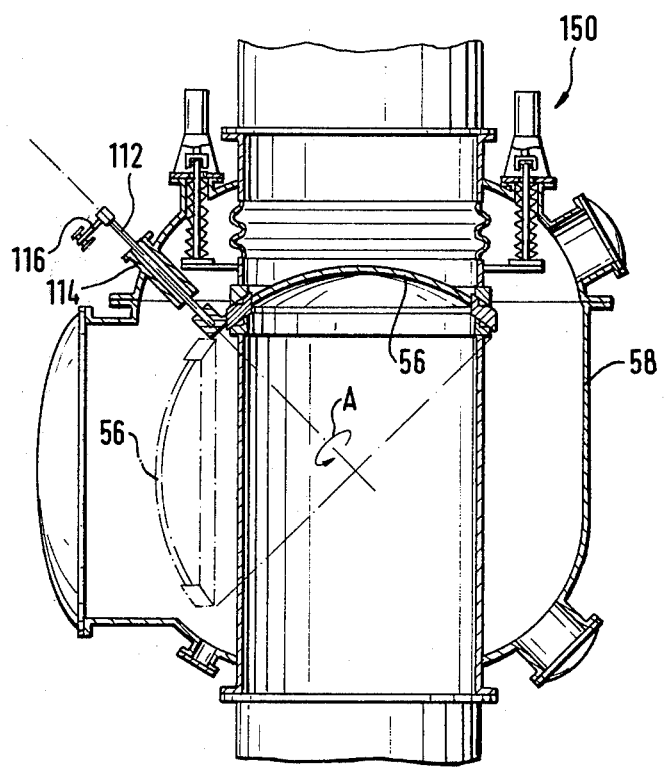
FIG. 9 is a longitudinal section of another embodiment of a mechanism for moving the shut-off plate of the type shown in FIGS. 1, 2 and 3.

FIG. 9 shows another embodiment of an apparatus for moving shut-off plate 56 between the open and closed position. Valve 150, apart from the mechanism for movement of shut-off plate 56, is identical with valve 50 shown in FIGS. 6 and 8. The shut-off plate 56 is rigidly connected with shaft 112. Shaft 112 is rotatably positioned in the wall of armoring 58 and is oriented in such a way so that its axis passes through the center of curvature of shut-off plate 56. Shaft 112 may be accommodated in a conventional housing 114 which is hermetically sealed by conventional seals. Shaft 112 communicates outside of the armoring 58 with a control means designed to pivot shaft 112 about its longitudinal axis as shown by arrow A. Connecting rod 116 which is integral with shaft 112 can be actuated by any mechanical means, such as, for example, by a hydraulic jack or an electric motor. Rotation of shaft 112 displaces shut-off plate 56 over a spherical surface to move the shut-off plate 56 from its closed position to its open position.

The aforementioned mechanisms for movement of shut-off plate 56 are particularly simple and reliable since they only involve rotary movements. It is known that hermetic sealing is far better obtained between rotating parts than in the case of parts that must move in a traversing manner such as has been heretofore used. The rotary displacement mechanisms are also far less likely to get clogged with foreign matter and, because of their simplicity, can have a reduced weight. It must be emphasized that the spherical shape of the shut-off plate 56 and of the sealing surfaces allows for simple and accurate machining of the hermetic sealing surfaces.

Although the present invention has been described with respect to piping carrying crude blast furnace gases in steel manufacture apparatus, it should be understood that the present invention provides a simple valve for opening and closing fluid conduits, particularly of the type having a wide cross section. The present invention can be used in many types of gas and/or liquid environments under various temperatures and pressures.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A valve for opening and closing a fluid conduit having an axis and a generally wide cross-section, the conduit having a slit therein defined by facing ends of upstream and downstream conduit portions, the valve comprising:
   a movable shut-off plate, said plate having a spherical shape and a peripheral sealing surface;
   means supporting said shut-off plate for movement with respect to the conduit axis and through said slit, said supporting means comprising a pair of oppositely situated variable length arms, first ends of said arms being coupled to said plate, said arms being resiliently biased in the direction of elongation, said supporting means further comprising a pair of oppositely disposed pivot shafts which engage said arms adjacent the second ends thereof, said pivot shafts defining an axis; and
   means for arcuately displacing said arms and plate about the axis of said pivot shafts to close the conduit when the plate is positioned within the conduit and open the conduit when the plate is positioned external to the conduit.

2. A valve according to claim 1 wherein the shut-off plate comprises a pair of contiguous portions having the same curvature, a first of said portions being provided with an aperture therein and the second of said portions defining a continuous spherical surface, said plate closing the conduit when the continuous portion thereof is aligned with the conduit and permitting fluid flow through the conduit when the apertured portion thereof is aligned with the conduit.

3. The valve of claim 2 further comprising:
   a valve housing, said valve housing being hermetically sealed to the exterior of the upstream and downstream conduit portions and defining a chamber which receives said plate continuous portion when the conduit is in the open condition.

4. The valve of claim 1 further comprising:
   a valve housing, said valve housing being hermetically sealed to the exterior of the upstream and downstream portions of the conduit and defining a chamber for receiving said valve plate when the conduit is in the open condition.

5. The valve of claim 1 wherein said means for arcuately displacing said plate about said supporting means pivot shafts comprises at least one hydraulic jack.

6. The valve of claim 1 wherein said means for arcuately displacing said valve plate about said supporting means pivot shafts comprises at least one actuator.

7. A device according to claim 6 wherein said actuator comprises a hydraulic jack.

8. The valve of claim 1 wherein the axis defined by said supporting means pivot shafts intersects the conduit axis and also intersects the center of the sphere defined by said plate.

9. The valve of claim 1 further comprising:
   compensator means positioned in one of the conduit portions to permit limited axial motion of the facing end of the said one conduit portion;
   means for resiliently biasing said compensator means in the direction of the facing end of the other conduit portion, the resilient bias delivered to said compensating means being in the opposite direction to and greater than the resilient elongating bias of the arms of said plate supporting means; and
   hydraulic actuator means for selectively opposing said compensator means resilient biasing means so as to cause the facing end of the one conduit portion to move away from the facing end of the other conduit portion to thereby permit free arcuate movement of said plate.

10. The apparatus of claim 9 further comprising:
    a valve housing, said valve housing being hermetically sealed to the exterior of the upstream and downstream portions of the conduit and defining a chamber for receiving said valve plate when the conduit is in the open condition.

11. The valve of claim 10 wherein the axis defined by said supporting means pivot shafts intersects the conduit axis and also intersects the center of the sphere defined by said plate.

12. The valve of claim 11 wherein said housing means includes an access aperture, a ventilation aperture and a cleaning aperture and means for hermetically sealing each of said apertures.

* * * * *